Jan. 10, 1967  C. E. PLYMALE  3,297,185

PLASTIC BOTTLE FINISH

Filed April 12, 1965

INVENTOR
CHARLES E. PLYMALE

BY

ATTORNEYS

United States Patent Office
3,297,185
Patented Jan. 10, 1967

3,297,185
PLASTIC BOTTLE FINISH
Charles E. Plymale, Maumee, Ohio, assignor to Owens-Illinois Glass Company, a corporation of Ohio
Filed Apr. 12, 1965, Ser. No. 447,439
4 Claims. (Cl. 215—43)

This invention relates to containers, and more particularly to a container adapted to receive a threaded closure.

Molded plastic containers of the type employing a threaded closure member, such as bottles, jars or the like normally include a high pitch, smooth integral thread formed on the neck portion of the container. When a closure having a smooth thread is applied to the smooth thread of the molded plastic container, there is a tendency for the closure to become loose on the finish. This is due, in part, to the self-lubricating qualities of the plastic materials normally used in molding the closures and containers, as well as the tendency of such materials to flow or creep under stress, thereby permitting the closure to work itself off to relieve a portion of the stress set up in the threads due to tightening of the closure on the container.

It is an object of this invention to provide a threaded container and closure including means to prevent the closure from becoming loose when tightened upon the container.

Another object of the invention is to provide a threaded container and closure having a retaining means integrally formed with the thread of one of the members to increase the torque required to remove the closure from the container.

Another object of this invention is to provide a container molded from a resilient plastic material and having a thread including retaining means to prevent a threaded closure from becoming loose when tightened upon the container.

Other objects and advantages of the invention will become apparent from the following specification, taken with the drawings, in which.

Figure 1:
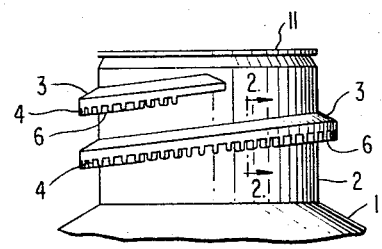
FIG. 1 is a fragmentary front elevation view of a molded plastic container embodying the invention.

Referring now to the drawings in detail, a molded plastic container embodying the present invention is illustrated generally by the numeral 1, and includes a cylindrical neck portion 2 having an external screw thread 3 integrally molded thereon. The screw thread 3 includes a plurality of integrally formed appendages 4 extending axially along the neck 2 from the load bearing surface 5 of thread 3. The plurality of appendages 4 are spaced circumferentially around neck 2 so that their distal edge 6, as viewed in the drawings, forms, in effect, a second load bearing surface spaced axially from the normal load bearing surface 5 of thread 3.

Figure 3:
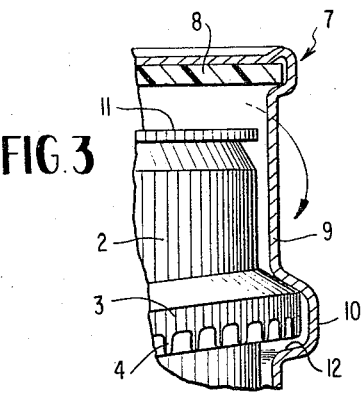
FIG. 3 is an enlarged fragmentary view in partial section showing a threaded closure being installed on a container according to FIG. 1.
Figure 2:
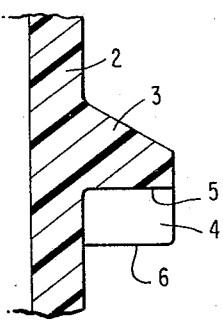
FIG. 2 is an enlarged fragmentary sectional view taken on line 2—2 of FIG. 1.
Figure 4:
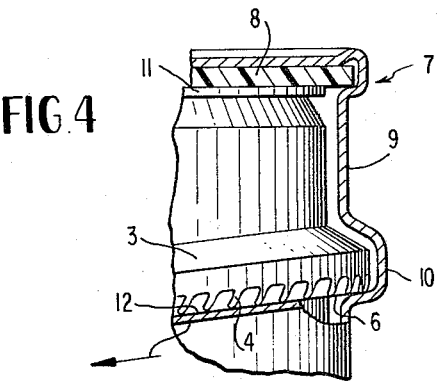
FIG. 4 is a view similar to FIG. 3 with the container shown in the fully closed position.
Figure 5:
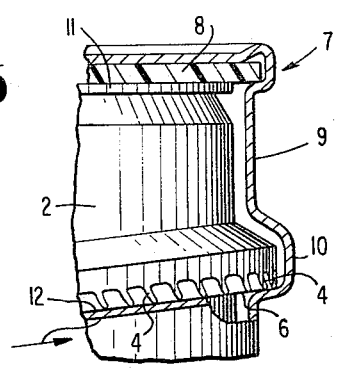
FIG. 5 is a view similar to FIG. 4 with the closure shown in a loosened position.

As shown in FIGS. 3–5, a closure member 7, of conventional molded plastic construction, includes a substantially planar end panel 8 with an integrally formed substantially cylindrical skirt 9 depending therefrom. Skirt 9 has a female screw thread 10 integrally formed therein for engaging the screw thread 3 on the neck of bottle 1 to secure the closure on the neck 2 of bottle 1 with the end panel 8 in sealing engagement with the top rim 11 of the container. The application of a tightening torque between closure 7 and container 1 will result in load bearing surface 12 of screw thread 10 applying an axial compressive load within appendages 4. Further relative rotation between the closure and container will cause deflection of the appendages 4 circumferentially around neck 2 as illustrated in FIG. 4. This circumferential deflection and axial compression results in an axial shift in the bearing surface 6 of appendages 4 in a direction toward the open end or rim 11 of the container, with the stresses in the deformed resilient appendages tending to move the closure axially along neck 2 in a direction to form a tight seal between panel 8 and rim 11.

To remove or loosen a closure 7 which has been installed on a container 1 as described above and illustrated in FIG. 4, it is necessary to apply sufficient loosening torque to further compress the appendages 4 in an axial direction sufficiently to permit them to be deflected circumferentially from the position shown in FIG. 4 through the dead center or axially aligned position of FIG. 3 to the circumferentially deflected position illustrated in FIG. 5. Thus, any attempt to remove the closure from the container results in an initial tightening of the seal between end panel 8 and the rim 11 of the container, thereby retaining the closure on the container until sufficient torque is applied to force the appendages through the dead center position.

After sufficient loosening torque has been applied to a closure to cause the appendages to move from the position illustrated in FIG. 4 to the position illustrated in FIG. 5, the closure may then be easily removed. Thus, the appendages form a resilient retaining means which releasably retains the closure against removal only during initial loosening of the closure and which is effective to resist the undesirable tendency of a closure installed on a resilient molded plastic container to work itself loose.

Figure 6:
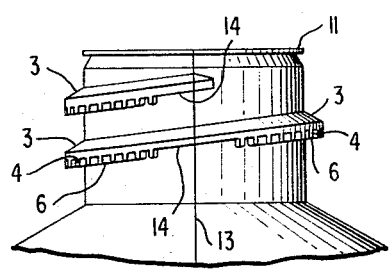
FIG. 6 is a view similar to FIG. 1 showing an alternate construction of the closure locking means.

Containers formed from a resiliently thermoplastic material such as polyethylene are frequently molded in a two-piece blow-mold wherein the two sections of the mold are separated upon completion of the blow molding process to permit the finished container to be removed. In the formation of a container according to the present invention in such a mold, the appendages may not be sufficiently flexible, even in the warm, recently molded state, to permit separation of the mold without damage or tearing of some of the appendages in the vicinity of the mold line 13. Accordingly, if desired, a number of these appendages may be omitted in this area as illustrated at 14 in FIG. 6 of the drawings. It is believed apparent that the length of the thread portion on each side of the mold line 13 which does not have the appendages 4 formed thereon will depend upon the properties of the material being employed, the more flexible and resilient materials making possible the formation of appendages relatively close to the mold line while less flexible material may require the first appendage to be spaced relatively far from the mold line.

While I have disclosed a preferred embodiment of my invention, I wish it understood that I do not intend to be limited solely thereto but that I do intend to cover all embodiments thereof which come within the spirit and scope of my invention.

I claim:

1. In combination, a container having a neck portion of circular cross section with screw threads formed on the outer surface thereof, a closure member having an end panel and a skirt portion with screw threads formed on the internal surface thereof for engaging the threads on said neck to tighten said closure on said container, one of said threaded portions being molded from a resilient synthetic resin material, and resilient retaining means molded from said synthetic resin material integrally with said one of said threaded portions on the load bearing surface of the threads thereon in position to be engaged by the screw thread on the other of said threaded portions when said closure is installed on said container, said retaining means being deformed upon application of closing torque between said closure and said container to thereby increase the torque required to loosen said closure.

2. The combination as defined in claim 1 wherein said retaining means includes a plurality of integrally formed resilient appendages on the load carrying face of the screw threads, said appendages extending axially along the surface of said resilient element and circumferentially deflected by the threads on the other of said thread bearing members upon installation of said closure on said container.

3. In a container molded from a resilient synthetic resin material and having a neck of circular cross section with screw threaded formed on the outer surface of said neck and extending outwardly therefrom, the improvement comprising, a plurality of circumferentially spaced appendages integrally molded from said synthetic resin material with said screw thread on the load bearing surface thereof and extending therefrom axially along said neck, said appendages being deflected circumferentially and axially of said neck by a threaded closure tightened upon said neck, said appendages in said deflected position remaining in contact with the closure to releasably resist rotation of the closure in a direction to remove the closure from said container.

4. A container molded from a resilient synthetic resin material comprising a neck portion with external screw threads formed thereon for receiving a threaded closure, closure retaining means integrally molded from said synthetic resin material with said external threads on the load bearing surface thereof, said closure retaining means including a plurality of resilient appendages extending from said load bearing surface axially of said neck and being deformable axially and circumferentially of said neck by a threaded closure installed on said container.

References Cited by the Examiner

UNITED STATES PATENTS

| | | | |
|---|---|---|---|
| 2,148,169 | 2/1939 | Merolle. | |
| 2,162,880 | 6/1939 | Brown | 215—43 |
| 2,776,066 | 1/1957 | Thornton | 215—44 |
| 2,886,089 | 5/1959 | Schlage | 151—25 |
| 3,039,648 | 6/1962 | Busch. | |

GEORGE O. RALSTON, *Primary Examiner.*

JOSEPH R. LECLAIR, *Examiner.*

D. F. NORTON, *Assistant Examiner.*